(12) United States Patent
Kageura

(10) Patent No.: US 9,508,986 B2
(45) Date of Patent: Nov. 29, 2016

(54) ELECTRODE MIXTURE PASTE, ELECTRODE, AND NON-AQUEOUS ELECTROLYTE RECHARGEABLE BATTERY

(75) Inventor: Jun-ichi Kageura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 13/882,760

(22) PCT Filed: Nov. 22, 2011

(86) PCT No.: PCT/JP2011/077453
§ 371 (c)(1),
(2), (4) Date: May 1, 2013

(87) PCT Pub. No.: WO2012/073919
PCT Pub. Date: Jun. 7, 2012

(65) Prior Publication Data
US 2013/0224588 A1 Aug. 29, 2013

(30) Foreign Application Priority Data
Nov. 29, 2010 (JP) .................. 2010-264840

(51) Int. Cl.
| H01M 4/36 | (2006.01) |
| H01M 4/131 | (2010.01) |
| H01M 4/136 | (2010.01) |
| H01M 4/58 | (2010.01) |
| H01M 4/62 | (2006.01) |
| H01M 10/054 | (2010.01) |
| H01M 4/505 | (2010.01) |
| H01M 4/525 | (2010.01) |
| H01M 4/04 | (2006.01) |
| H01M 4/485 | (2010.01) |

(52) U.S. Cl.
CPC ............ *H01M 4/364* (2013.01); *H01M 4/131* (2013.01); *H01M 4/136* (2013.01); *H01M 4/5825* (2013.01); *H01M 4/622* (2013.01); *H01M 10/054* (2013.01); *H01M 4/0404* (2013.01); *H01M 4/485* (2013.01); *H01M 4/505* (2013.01); *H01M 4/525* (2013.01); *H01M 4/624* (2013.01); *Y02E 60/122* (2013.01)

(58) Field of Classification Search
CPC .............................. H01M 4/621; H01M 4/36
USPC ............... 429/211, 212, 50, 218.1, 222, 232
See application file for complete search history.

(56) References Cited

U.S. PATENT DOCUMENTS

| 5,011,748 A * | 4/1991 | Shacklette et al. ............. 429/50 |
| 5,011,784 A | 4/1991 | Ratnakumar |
| 5,051,325 A | 9/1991 | Shishikura et al. |
| 5,419,985 A * | 5/1995 | Koksbang ....................... 429/212 |
| 2001/0019799 A1* | 9/2001 | Fetcenko .................. H01M 4/32 429/232 |
| 2007/0264568 A1* | 11/2007 | Ryu ..................... H01M 4/0404 429/213 |
| 2008/0096109 A1* | 4/2008 | Fukumine .......... H01M 4/0404 429/212 |
| 2008/0199778 A1 | 8/2008 | Hirata et al. |
| 2009/0120163 A1 | 5/2009 | Takeda et al. |
| 2010/0248001 A1 | 9/2010 | Kuze et al. |
| 2010/0266900 A1 | 10/2010 | Makidera et al. |
| 2011/0159345 A1 | 6/2011 | Makidera et al. |
| 2012/0015230 A1 | 1/2012 | Kuze et al. |

FOREIGN PATENT DOCUMENTS

| CN | 1723578 A | 1/2006 |
| CN | 101073170 A | 11/2007 |
| CN | 101361212 A | 2/2009 |
| JP | 0230069 A | 1/1990 |
| JP | 11-250915 A | 9/1999 |
| JP | 2002-246066 A | 8/2002 |
| JP | 2003-157851 A | 5/2003 |
| JP | 2004-134369 A | 4/2004 |
| JP | 2006-216509 A | 8/2006 |
| JP | 2008-235249 A | 10/2008 |
| JP | 2008-260666 A | 10/2008 |
| JP | 2009-123448 A | 6/2009 |
| JP | 2009-129702 A | 6/2009 |
| JP | 2009-135092 A | 6/2009 |
| JP | 201080424 A | 4/2010 |
| JP | 2010-160965 A | 7/2010 |
| JP | 2010235434 A | 10/2010 |
| WO | 02097907 A2 | 12/2002 |

OTHER PUBLICATIONS

First Office Action issued Nov. 25, 2014 in corresponding Chinese Patent Application No. 201180056220.0 with translation.
Notice of Reasons for Rejection issued May 12, 2015 in corresponding Japanese Patent Application No. 2011-243146 with translation.
Communication dated Jul. 16, 2015 from the State Intellectual Property Office of the P.R.C. in counterpart application No. 201180056220.0.
Communication dated Jan. 5, 2016, issued by the State Intellectual Property Office of the P.R.C. in corresponding Chinese Application No. 201180056220.0.
Communication dated Aug. 18, 2015 from the Japanese Patent Office issued in corresponding Japanese application No. 2012026034.
Naoaki Yabuuchi, et al., "Crystal Structures and Electrode Performance of Alpha-NaFeO$_2$ for Rechargeable Sodium Batteries", Electrochemistry, vol. 80, No. 10, 2012, pp. 716-719.
Roman Caudillo, "Magnetic, Thermoelectric, and Electronic Properties of Layered Oxides and Carbon Materials", Dissertation, The University of Texas at Austin, Aug. 2007, p. 61-62.
Naoaki Yabuuchi, et al., "Research Development on Sodium-Ion Batteries", Chemical Reviews, vol. 114, 2014, pp. 11636-11682.

\* cited by examiner

*Primary Examiner* — Patrick Ryan
*Assistant Examiner* — Alex Usyatinsky
(74) *Attorney, Agent, or Firm* — Sughrue Mion, PLLC

(57) ABSTRACT

The present invention provides an electrode mixture paste containing an electrode active material, a conductive material, a binder, and an organic solvent. The electrode active material has a sodium-containing transition metal compound, the binder has a polymer soluble to the organic solvent, and the polymer does not have a structural unit derived from vinylidene halide.

5 Claims, No Drawings

ELECTRODE MIXTURE PASTE, ELECTRODE, AND NON-AQUEOUS ELECTROLYTE RECHARGEABLE BATTERY

CROSS REFERENCE TO RELATED APPLICATIONS

This application is a National Stage of International Application No. PCT/JP2011/077453 filed Nov. 22, 2011, claiming priority based on Japanese Patent Application No. 2010-264840, filed Nov. 29, 2010, the contents of all of which are incorporated herein by reference in their entirety.

TECHNICAL FIELD

The present invention relates to an electrode mixture paste, an electrode, and a non-aqueous electrolyte secondary battery.

BACKGROUND ART

The electrode mixture is used in an electrode of a non-aqueous electrolyte secondary battery or the like, and a sodium secondary battery is studied as a non-aqueous electrolyte secondary battery. Sodium that constitutes the sodium secondary battery is abundant in resources, and is an inexpensive material. The sodium secondary battery is put into practical use, whereby it is expected that a large number of large-sized power supplies can be supplied.

A sodium secondary battery usually comprises a positive electrode containing a positive electrode active material which can be doped and dedoped with a sodium ion and a negative electrode containing a negative electrode active material which can be doped and dedoped with a sodium ion, and an electrolyte.

The electrode contains a current collector and an electrode mixture placed on the current collector. In order to place an electrode mixture on a current collector, an electrode mixture paste containing and an electrode mixture and a solvent is used. The electrode mixture paste includes a material obtained by mixing and kneading an electrode active material such as a positive electrode active material and a negative electrode active material, a conductive material, a binder, and a solvent. Examples of the mixture of a binder and a solvent include organic solvent-based binders such as a solution obtained by dissolving polyvinylidene fluoride (hereinafter, may be referred to as PVdF) as a binder into an organic solvent such as N-methyl-2-pyrrolidone (hereinafter, may be referred to as NMP) as a dispersion medium (Patent Document 1).

PRIOR ART DOCUMENTS

Patent Documents

Patent Document 1: JP-A-2009-129702

DISCLOSURE OF THE INVENTION

However, there was newly found a problem that, when an electrode mixture paste containing a sodium-containing compound that can be doped and dedoped with a sodium ion as an electrode active material is prepared using PVdF as a binder, gelation of the electrode mixture paste is caused, and thus coating is difficult. Even the electrode mixture paste is coatable, the obtained electrode has weak adhesive force between the current collector and the electrode mixture and weak adhesive force between constituent particles of the electrode mixture. Therefore, shedding of the electrode mixture during coating and an increase in the internal resistance of the battery are caused. Also, in the case of a repeatedly chargeable and dischargeable secondary battery, the increase in the internal resistance may lead to deterioration of charge and discharge cycle characteristics, and shorten battery life.

The present invention provides the followings.

<1> An electrode mixture paste comprising an electrode active material, a conductive material, a binder, and an organic solvent, wherein the electrode active material comprises a sodium-containing transition metal compound, the binder comprises a polymer soluble in the organic solvent, and the polymer has no a structural unit derived from a vinylidene halide.

<2> The electrode mixture paste according to <1>, wherein the polymer has the following structural unit (A) in the main chain:

$$-[CHR^1-CR^2R^3]-\quad (A)$$

wherein $R^1$ and $R^2$ are each independently a hydrogen atom, a carboxyl group, or a divalent hydrocarbon group, $R^3$ is a hydrogen atom, a hydroxyl group, a thiol group, an ester group, an aryl group, a nitrile group, an amino group, an amide group, a cyclic amide group, a carboxyl group, an ether group, a phosphate group, a sulfonate group, a carboxylic acid ester group, or an inorganic acid ester group, when the polymer has a plurality of structural units (A),
$R^1$ groups may be the same or different,
$R^2$ groups may be the same or different, and
$R^3$ groups may be the same or different, and
$R^1$, $R^2$ and $R^3$ may be the same or different.

<3> The electrode mixture paste according to <1> or <2>, wherein the sodium-containing transition metal compound is represented by the following formula (B):

$$Na_xMO_2\quad (B)$$

wherein M is one or more elements selected from the group consisting of Fe, Ni, Co, Mn, Cr, V, Ti, B, Al, Mg and Si, and x is more than 0 and not more than 1.2.

<4> The electrode mixture paste according to any of <1> to <3>, wherein the amount of water contained in the electrode mixture paste is 30000 ppm or less.

<5> An electrode produced by applying the electrode mixture paste as defined in any of <1> to <4> on a current collector.

<6> A non-aqueous electrolyte secondary battery having the electrode as defined in <5> as a positive electrode.

<7> The non-aqueous electrolyte secondary battery according to <6> further having a separator.

MODE FOR CARRYING OUT THE INVENTION

<Electrode Mixture Paste>

An electrode mixture paste comprises an electrode active material, a conductive material, a binder, and an organic solvent. The electrode active material comprises a sodium-containing transition metal compound, the binder comprises a polymer soluble in the organic solvent, and the polymer has no a structural unit derived from a vinylidene halide.

<Organic Solvent>

Examples of the organic solvent include amides such as N-methyl-2-pyrrolidone, N,N-dimethylacetamide, and dimethylformamide; alcohols such as isopropyl alcohol, ethyl alcohol, and methyl alcohol; ethers such as propylene glycol dimethyl ether; ketones such as acetone, methyl ethyl ketone, and methyl isobutyl ketone; and the like, as polar solvents. Examples of the organic solvent include hexane, toluene and the like, as nonpolar solvents.

<Electrode Active Material>

An electrode active material comprises a sodium-containing transition metal compound, and the sodium-containing transition metal compound can be doped and dedoped with a sodium ion.

Examples of the sodium-containing transition metal compound include the following:

Oxides represented by $NaM^1{}_{a1}O_2$ such as $NaFeO_2$, $NaMnO_2$, $NaNiO_2$ and $NaCoO_2$, oxides represented by $Na_{0.44}Mn_{1-a2}M^1{}_{a2}O_2$, oxides represented by $Na_{0.7}Mn_{1-a2}M^1{}_{a2}O_{2.05}$ ($M^1$ is one or more transition metal elements, $0<a1<1$, $0\le a2<1$);

Oxides represented by $Na_bM^2{}_cSi_{12}O_{30}$ such as $Na_6Fe_2Si_{12}O_{30}$ and $Na_2Fe_5Si_{12}O_{30}$ ($M^2$ is one or more transition metal elements, $2\le b\le 6$, $2\le c\le 5$);

Oxides represented by $Na_dM^3{}_eSi_6O_{18}$ such as $Na_2Fe_2Si_6O_{18}$ and $Na_2MnFeSi_6O_8$ ($M^3$ is one or more transition metal elements, $2\le d\le 6$, $1\le e\le 2$);

Oxides represented by $Na_fM^4{}_gSi_2O_6$ such as $Na_2FeSiO_6$ ($M^4$ is one or more element selected from the group consisting of transition metal elements, Mg and Al, $1\le f\le 2$, $1\le g\le 2$);

Phosphates such as $NaFePO_4$, $NaMnPO_4$, and $Na_3Fe_2(PO_4)_3$;

Fluorophosphates such as $Na_2FePO_4F$, $Na_2VPO_4F$, $Na_2MnPO_4F$, $Na_2CoPO_4F$, and $Na_2NiPO_4F$;

Fluorosulfates such as $NaFeSO_4F$, $NaMnSO_4F$, $NaCoSO_4F$, and $NaFeSO_4F$;

Borates such as $NaFeBO_4$ and $Na_3Fe_2(BO_4)_3$;

Fluorides represented by $Na_hM^5F_6$ such as $Na_3FeF_6$ and $Na_2MnF_6$ (M is one or more transition metal elements, $2\le h\le 3$).

Among the sodium-containing transition metal compounds, a sodium-containing transition metal oxide is preferable, and an oxide represented by the following formula (B) is more preferable. The oxide represented by the following formula (B) is used as an electrode active material, particularly a positive electrode active material, whereby the charge and discharge capacity of the obtained battery can be more increased.

$$Na_xMO_2 \qquad (B)$$

wherein M is one or more elements selected from the group consisting of Fe, Ni, Co, Mn, Cr, V, Ti, B, Al, Mg and Si, and x is more than 0 and not more than 1.2.

<Conductive Material>

Examples of the conductive material include carbonaceous materials, and more specifically, include graphite powder, carbon black (for example, acetylene black, etc.), fibrous carbonaceous materials (carbon nanotube, carbon nanofiber, carbon fibers by vapor-phase growth, etc.) and the like. Carbon black (for example, acetylene black, etc.) is fine particles having a large surface area and thus can be added in a small amount to an electrode mixture to enhance the electric conductivity inside the obtained electrode and to improve charge-discharge efficiency and large current discharge properties of the obtained battery. The ratio of the conductive material in the electrode mixture is usually from 5 to 20 parts by weight based on 100 parts by weight of the electrode active material. When a fine-particle carbonaceous material or fibrous carbonaceous material as described above is used as the conductive material, it is also possible to reduce this ratio.

<Binder>

The binder comprises a polymer soluble in the organic solvent, and the polymer has no a structural unit derived from a vinylidene halide.

Here, the presence or absence of a structural unit derived from a vinylidene halide in the binder can be confirmed, for example, by FT-IR measurement or NMR measurement of the binder resin.

The binder preferably has the following structural unit (A) in the main chain.

$$\mathrm{\{-CHR^1-CR^2R^3-\}} \qquad (A)$$

wherein each of $R^1$ and $R^2$ is independently a hydrogen atom, a carboxyl group, or a divalent hydrocarbon group, $R^3$ is a hydrogen atom, a hydroxyl group, a thiol group, an ester group, an aryl group, a nitrile group, an amino group, an amide group, a cyclic amide group, a carboxyl group, an ether group, a phosphate group, a sulfonate group, a carboxylic acid ester group, or an inorganic acid ester group, when the polymer has a plurality of structural units (A), a plurality of $R^1$s may be the same or different from each other, a plurality of $R^2$s may be the same or different from each other, a plurality of $R^3$s may be the same or different from each other, and $R^1$, $R^2$ and $R^3$ may be the same or different from each other.

The binder has a polymer of monomers that provide the above structural unit (A).

Examples of the monomers that provide the structural unit <A> include ethylene, vinyl alcohol, ethyl thiol, carboxylic acid vinyl ester, vinylaryl, acrylonitrile, vinylamine, vinyl pyrrolidone, acrylic acid, methacrylic acid, crotonic acid, unsaturated dicarboxylic acid, vinyl ether, vinyl inorganic acid, acrylic acid ester, methacrylic acid ester, crotonic acid ester, unsaturated dicarboxylic acid ester, and vinyl inorganic acid ester.

Examples of the carboxylic acid vinyl ester include vinyl acetate, vinyl propionate, vinyl laurate, and the like.

Examples of the vinylaryl include styrene, 2-vinylnaphthalene, 9-vinylanthracene, vinyltolyl, and the like.

Examples of the unsaturated dicarboxylic acid include maleic acid, fumaric acid, methaconic acid, glutaconic acid, methaconic acid, and crotonic acid.

Examples of the vinyl ether include 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, 6-hydroxyhexyl vinyl ether, and diethylene glycol monovinyl ether.

Examples of the vinyl inorganic acid include vinyl phosphoric acid and vinyl sulfonic acid.

Examples of the acrylic acid ester include methyl acrylate, ethyl acrylate, propyl acrylate, isopropyl acrylate, butyl acrylate, isobutyl acrylate, tert-butyl acrylate, pentyl acrylate, methoxyethyl acrylate, ethoxyethyl acrylate, 2-ethylhexyl acrylate, 2-hydroxyethyl acrylate, 2-hydroxypropyl acrylate, dimethylaminoethyl acrylate, diethylaminoethyl acrylate, phosphoric acid acrylate, and sulfonic acid acrylate.

Examples of the methacrylic acid ester include methyl methacrylate, ethyl methacrylate, propyl methacrylate, isopropyl methacrylate, butyl methacrylate, isobutyl methacrylate, tert-butyl methacrylate, pentyl methacrylate, methoxyethyl methacrylate, ethoxyethyl methacrylate, pentyl methacrylate, 2-ethylhexyl methacrylate, 2-hydroxyethyl methacrylate, 2-hydroxypropyl methacrylate, dimethylaminoethyl methacrylate, diethylaminoethyl methacrylate, phosphoric acid methacrylate, and sulfonic acid acrylate.

Examples of the crotonic acid ester include methyl crotonate, ethyl crotonate, propyl crotonate, butyl crotonate, isobutyl crotonate, tert-butyl crotonate, pentyl crotonate, n-hexyl crotonate, 2-ethylhexyl crotonate, and hydroxypropyl crotonate, Examples of the unsaturated dicarboxylic acid ester include dimethyl maleate, monooctyl maleate, monobutyl maleate, and monooctyl itaconate.

Examples of the inorganic acid ester include vinyl phosphoric acid esters such as methyl vinyl phosphate, ethyl vinyl phosphate, and propyl vinyl phosphate; and vinyl sulfonic acid esters such as methyl vinyl sulfonate, ethyl vinyl sulfonate, and propyl vinyl sulfonate.

In addition to the above, examples of the monomer include α-olefin, conjugated diene, ethylene oxide, propylene oxide, ethylene sulfide, and propylene sulfide.

Examples of the α-olefin include propylene, 1-butene, isobutene, 1-pentene, and the like Examples of the conjugated diene include 1,2-propadiene, 1,3-butadiene, isoprene, 1,3-pentadiene, and the like.

The binder preferably has a glass transition temperature of −50° C. to 0° C., whereby flexibility of the obtained electrode is improved, and a non-aqueous electrolyte secondary battery, which is sufficiently usable even in a low temperature environment, can be obtained.

Preferable examples of the binder include acrylic polymers such as polyacrylic acid, polyalkyl acrylate (the alkyl part of which has a carbon number of 1 to 20), acrylic acid-alkyl acrylate copolymer (the alkyl part of which has 1 to 20 carbon atoms), polyacrylonitrile, acrylic acid-alkyl acrylate-acrylonitrile copolymer, polyacrylamide, acrylonitrile-butadiene copolymer, and acrylonitrile-butadiene copolymer hydrate;

methacrylic polymers such as polymethacrylic acid, polyalkyl methacrylate (the alkyl part of which has 1 to 20 carbon atoms), and methacrylic acid-alkyl methacrylate copolymer;

olefin polymers such as polyvinyl alcohol, ethylene-vinyl alcohol copolymer, polyvinylpyrrolidone, ethylene-vinyl acetate copolymer, ethylene-vinyl acetate-alkyl acrylate copolymer (the alkyl part of the alkyl group has 1 to 20 carbon atoms), ethylene-methacrylic acid copolymer, ethylene-acrylic acid copolymer, ethylene-alkyl methacrylate copolymer, ethylene-alkyl acrylate copolymer, and ethylene-acrylonitrile copolymer; and styrene-containing polymers such as acrylonitrile-styrene-butadiene copolymer, styrene, acrylonitrile copolymer, styrene-butadiene copolymer, and styrene-butadiene copolymer hydrate.

The polymer can be obtained by emulsion polymerization, suspension polymerization, and dispersion polymerization, and can be also obtained by solution polymerization, radiation polymerization, and plasma polymerization.

An emulsifier and dispersant used in emulsion polymerization, suspension polymerization, and dispersion polymerization may be those used in the usual emulsion polymerization method, suspension polymerization method, dispersion polymerization method, and the like. Examples of the emulsifier and dispersant include protective colloids such as hydroxyethylcellulose, methylcellulose, and carboxymethylcellulose; nonionic surfactants such as polyoxyethylene alkyl ether, polyoxyethylene alkyl phenol ether, polyoxyethylene-polyoxypropylene block copolymer, polyoxyethylene fatty acid ester, and polyoxyethylene sorbitan fatty acid ester; and anionic surfactants such as alkyl sulfonic acid ester, alkylbenzene sulfonic acid salt, alkyl sulfosuccinic acid salt, alkyl diphenyl ether disulfonic acid salt, polyoxyethylene alkylsulfuric acid salt, and polyoxyethylene alkylphosphoric acid ester. These may be used solely or as a combination of two or more thereof. The amount of the emulsifier and the dispersant added can be arbitrarily set, and is usually about 0.01 to 10 parts by weight based on 100 parts by weight of the total amount of the monomers, but the emulsifier and the dispersant may not be used depending on the polymerization conditions. As the binder, a commercially available binder may be used.

The electrode mixture paste may contain two or more binders. By using two or more binders, flowability of the electrode mixture paste, and binding properties and flexibility of the electrode obtained by using the electrode mixture paste can be adjusted.

<Other Binder>

The electrode mixture paste may further contain, other binder that does not have a structural unit derived from vinylidene halide. Here, other binder is a polymer that is insoluble in the organic solvent. By concurrently using other binder, binding properties and flexibility of the electrode obtained by using the electrode mixture paste can be adjusted.

Examples of the other binder include polyolefin resins such as polyethylene and polypropylene, polytetrafluoroethylene (PTFE), tetrafluoroethylene/ethylene copolymer (ETFE), and the like, and the other binder can be selected depending on the type of the organic solvent.

<Method for Producing Electrode Active Material>

Among the sodium-containing transition metal compounds, for example, a sodium-containing transition metal oxide can be produced by calcining a mixture of metal-containing compounds. The mixture has a composition that can be a sodium-containing transition metal oxide by calcination. The sodium-containing transition metal oxide can be produced, specifically by weighing metal-containing compounds containing a corresponding metal element so as to be a prescribed composition, mixing the compounds to obtain a mixture, and calcining the mixture. For example, a sodium-containing transition metal oxide having a metal element ratio of Na:Mn:Fe:Ni=1:0.3:0.4:0.3, that is one of preferable metal element ratio, can be produced by weighing each raw material of $Na_2CO_3$, $MnO_2$, $Fe_3O_4$, and $Ni_2O_3$, so as to be 1:0.3:0.4:0.3, mixing the raw materials, and calcining the obtained mixture.

Examples of the metal-containing compound that can be used for producing the sodium-containing transition metal oxide include oxides, and compounds that can be an oxide when being decomposed at high temperature and/or oxidized, for example, hydroxides, carbonates, nitrates, halides, or oxalates. Examples of the sodium compound include one or more compounds selected from the group consisting of sodium hydroxide, sodium chloride, sodium nitrate, sodium peroxide, sodium sulfate, sodium bicarbonate, sodium oxalate, and sodium carbonate, and these sodium compounds may be a hydrate. The sodium compound is preferably sodium carbonate, from the viewpoint of handling properties. The manganese compound is preferably $MnO_2$, the iron compound is preferably $Fe_3O_4$, and the nickel compound is preferably $Ni_2O_3$. These metal-containing compounds may be a hydrate.

Other than the above method, the mixture of the metal-containing compounds can be also obtained, for example, by obtaining a precursor of the metal-containing compound by the following coprecipitation method, and mixing the obtained precursor of the metal-containing compound and the sodium compound.

Specifically, using a compound having M such as chlorides, nitrates, acetates, formates, and oxalates (herein, M is same as described above) as a raw material, these compounds are dissolved in water, to obtain an aqueous solution containing M, the aqueous solution is contacted with a precipitant, whereby a precipitate containing a precursor of the metal-containing compound can be obtained. Among these raw materials, chlorides are preferable. When the raw material difficult to be dissolved in water, for example, an oxide, hydroxide, or metal material is used as a raw material, an aqueous solution containing M car, be also obtained by dissolving these raw materials in an acid such as hydrochloric acid, sulfuric acid, or nitric acid or an aqueous solution of these acids.

Examples of the precipitant include one or more compounds selected from the group consisting of LiOH (lithium hydroxide), NaOH (sodium hydroxide), KOH (potassium hydroxide), $Li_2CO_3$ (lithium carbonate), $Na_2CO$ (sodium carbonate), $K_2CO_3$ (potassium carbonate), $(NH_4)_2CO_3$ (ammonium carbonate), and $(NH_2)_2CO$ (urea). These compounds may be a hydrate, and the compound and the hydrate may be used in combination. The precipitant is preferably an aqueous solution form in which these compounds are dissolved in water. The concentration of the compound in the aqueous solution is about 0.5 to 10 mol/liter, and preferably about 1 to 8 mol/liter. The precipitant is preferably KOH, and more preferably an aqueous KOH solution. The precipitant also includes ammonia water, and ammonia water and an aqueous solution in which the compound is dissolved in water may be used in combination.

The method for bringing an aqueous solution containing M into contact with a precipitant include a method of adding a precipitant (including a precipitant in an aqueous solution form) to an aqueous solution containing M, a method of adding an aqueous solution containing M to a precipitant in an aqueous solution form, and a method of adding an aqueous solution containing M and a precipitant (including a precipitant in an aqueous solution form), to water. It is preferred to be accompanied by stirring upon these addition. Among the above contact methods, a method of adding an aqueous solution containing M to a precipitant in an aqueous solution form is preferable because it is easy to keep the pH and to control the particle size. In this case, the pH tends to decrease with adding an aqueous solution containing M to a precipitant in an aqueous solution form, and it is preferable to add the aqueous solution containing M while adjusting this pH to be 9 or more and preferably 10 or more. This adjustment can be also carried out by adding the precipitant in an aqueous solution form. The precipitate can be obtained by the contact. This precipitate contains a precursor of the metal-containing compound.

After the contact of the aqueous solution containing M with the precipitant, a slurry is usually obtained, and should be subjected to solid-liquid separation, to collect a precipitate. Solid-liquid separation may be carried out by arty method, but from the viewpoint of operability, a method according to solid-liquid separation such as filtration is preferably used, and a method of volatilizing a liquid content by heating such as spray drying may be used. The collected precipitate may be washed and dried. To the precipitate obtained after solid-liquid separation, the excess component of the precipitant component may be adhered, and the component can be reduced by washing. As a washing liquid used for washing, water is preferably used, and a water-soluble organic solvent such as alcohol or acetone may be used. Examples of drying include heat drying, air blast drying, vacuum drying, and the like. Heat drying is carried out at usually from about 50 to about 300° C. and preferably from about 100 to about 200° C. Washing and drying may be carried out twice or more. The precursor of the metal-containing compound can be obtained thereby.

In the mixture of the metal-containing compounds, or the mixture of the precursor of the metal-containing compound and the sodium compound, examples of the mixing method include dry mixing or wet mixing, and from the viewpoint of simplicity, dry mixing is preferable. Examples of a mixing apparatus include a stirring mixer, a V-shaped mixer, a W-shaped mixer, a ribbon mixer, a drum mixer, and a ball mill.

The calcination temperature depends on the type of the used sodium compound, but is usually from about 400 to about 1200° C. and preferably from about 500 to about 1000° C. The time of keeping at the calcination temperature is usually from 0.1 to 20 hours and preferably from 0.5 to 10 hours. The temperature rising rate up to the calcination temperature is usually from 50 to 400° C./hour, and the temperature dropping rate down to room temperature from the calcination temperature is usually from to 400° C./hour. The calcination atmosphere is, for example, air, oxygen, nitrogen, argon or a mixed gas thereof, and is preferably air.

A halide such as fluoride and chloride is used in an appropriate amount as the metal-containing compound, crystallinity of the produced sodium-containing transition metal oxide and the average particle size of the particles constituting the sodium-containing transition metal oxide can be controlled. In this case, the halide may play a part as a reaction accelerator (flux). Examples of the flux include $NaF$, $MnF_3$, $FeF_2$, $NiF_2$, $CoF_2$, $NaCl$, $MnCl_2$, $FeCl_2$, $FeCl_3$, $NiCl_2$, $CoCl_2$, $Na_2CO_3$, $NaHCO_3$, $NH_4Cl$, $NH_4I$, $B_2O_3$ and $H_3BO_3$, and the flux can be used as raw materials of the mixture (metal-containing compounds) or can be added to the mixture in an appropriate amount and used. These fluxes may be a hydrate.

When the sodium-containing transition metal compound is used as a positive electrode active material for a sodium secondary battery, it may be preferable to adjust the particle size by arbitrarily subjecting the sodium-containing transition metal compound obtained as described above to pulverization using an apparatus that is usually industrially used, such as a ball mill, jet mill, or vibration mill, and washing and classifying the pulverized compound. Calcination may be carried out twice or more. The particle surface of the sodium-containing transition metal compound may be subjected to surface treatment such as coating with an inorganic substrate containing Si, Al, Ti, Y, and the like.

After surface treatment, when heat-treated, while it depends on the temperature of heat treatment, the BET specific surface area of the powder after heat treatment is sometimes smaller than the range of the BET specific surface area in the sodium-containing transition metal compound.

<Method for Producing Electrode Mixture Paste>

A method for producing an electrode mixture paste will be described. An electrode mixture paste can be obtained by kneading an electrode active material, a conductive material, a binder, and an organic solvent. The kneading method is not particularly limited. The mixer used for kneading preferably has high shear force, and specific examples of the mixer include a planetary mixer, a kneader, an extrusion type kneading machine, a thin-film spin system high-speed mixer, and the like.

As the order of mixing, the electrode active material, the conductive material, the binder, and the organic solvent may be mixed at one time, and the binder, the electrode active material, and the conductive material may be added to the organic solvent and mixed in turn. The order is not particularly limited. For example, a mixture of the electrode active material and the conductive material may be gradually added. The organic solvent and the binder may be previously mixed, to dissolve the binder in the organic solvent.

The ratio of the electrode components in the electrode mixture paste, namely the content of the electrode active material, the conductive material and the binder based on the electrode mixture paste, is usually from 30 to 90% by weight, preferably from 30 to 80% by weight, and more preferably from to 70% by weight, from the viewpoint of coatability.

<Amount of Water Contained in Electrode Mixture Paste>

The amount of water contained in the electrode mixture paste is preferably 30000 ppm or less, and more preferably 10000 ppm or less. The amount of water is 30000 ppm or less, whereby dispersibility of the electrode active material and the conductive material in the electrode mixture paste can be improved, and reaggregation of the electrode active material and the conductive material can be suppressed. As a result, the viscosity of the electrode mixture paste is stabilized, and the electrode mixture paste can be uniformly applied on the current collector. The lower limit of the amount of water is preferably 1000 ppm or more, and whereby the time course of the viscosity of the electrode mixture paste can be suppressed.

The amount of water can be measured, for example, by potentiometric titration, amperometric titration, coulometric titration, Karl Fischer titration (JIS-K0113), and the like. In the present invention, the amount of water contained in the electrode mixture paste is the value measured by Karl Fischer titration. Here, ppm refers to ppm by weight.

<Method for Producing Electrode>

An electrode will be described. The electrode is obtained by applying an electrode mixture paste on a current collector and drying the obtained applied current collector. The solvent in the electrode mixture paste is removed by drying, and the electrode mixture binds to the current collector, to obtain an electrode.

Examples of the current collector include electric conductors such as Al, Ni, and stainless steel, and Al is preferred in that Al can be easily processed into a thin film and is inexpensive. Examples of the form of the current collector include foil, flat plate, mesh, net, lath, perforated metal and embossed, and combinations thereof (for example, mesh-like flat plate, etc.). Concavities and convexities may be formed on the surface of the current collector by etching.

The method of applying the electrode mixture paste on the current collector is not particularly limited. Examples of the method include a slit die coating method, a screen coating method, a curtain coating method, a knife coating method, a gravure coating method, an electrostatic spray method, and the like. Examples of drying after the coating include heat drying, air blast drying, vacuum drying, and the like. The temperature in heat drying is usually from about 50 to about 150° C. Pressing may be performed after drying. Examples of the pressing method include methods such as press mold and roll pressing. The electrode can be produced thereby. The thickness of the electrode is usually from about 5 to about 500 μm.

The electrode obtained using the electrode mixture paste of the present invention is particularly useful as a positive electrode in the non-aqueous electrolyte secondary battery.

<Non-Aqueous Electrolyte Secondary Battery>

A non-aqueous electrolyte secondary battery has electrodes. A non-aqueous electrolyte secondary battery can be produced by obtaining an electrode group by laminating, or laminating and winding a positive electrode, a separator, and a negative electrode and accommodating this electrode group in a battery can, and injecting an electrolytic solution into the battery can. As the positive electrode, for example, the electrode obtained using the electrode mixture paste of the present invention is used. The negative electrode is usually an electrode in which a negative electrode mixture is supported on a negative electrode current collector, and the electrolytic solution is usually an organic solvent in which an electrolyte is dissolved.

Examples of the shape of the electrode group include shapes whose cross section when the electrode group is cut in a direction perpendicular to the axis of the winding or whose cross section when the electrode group is cut in a direction parallel to the lamination direction reveals circle, ellipse, rectangle, rounded rectangle, and the like. Examples of the shape of the battery include a paper shape, a coin shape, a cylindrical shape, a square shape, and the like.

<Non-Aqueous Electrolyte Secondary Battery—Negative Electrode>

The negative electrode can be doped and dedoped with a sodium ion at a potential lower than a positive electrode. The negative electrode includes electrodes in which a negative electrode mixture containing a negative electrode active material is supported on a negative electrode current collector, electrodes made of sodium metal, or electrodes made of a sodium alloy. The negative electrode active material includes, in addition to sodium metal or sodium alloy, carbonaceous materials such as natural graphite, artificial graphite, cokes, carbon black, pyrolytic carbons, carbon fiber, and organic polymer compound calcined bodies which can be doped and dedoped with a sodium ion. Examples of the shape of the carbonaceous material include shapes of flake such as natural graphite, sphere such as mesocarbon microbeads, fiber such as graphitized carbon fiber, or aggregate of fine powder. Here, the carbonaceous material may play a part as a conductive material.

As an example of the negative electrode active material, a chalcogen compound such as an oxide and sulfide which can be doped and dedoped with a sodium ion at a potential lower than a positive electrode can be also used.

The negative electrode mixture may contain a binder, a conductive material, and the like, as required. The negative electrode of the non-aqueous electrolyte may contain a mixture of the negative electrode active material and the binder. Examples of the binder include thermoplastic resins, and specifically include PVdF, thermoplastic polyimide, carboxymethylcellulose, polyethylene, and polypropylene.

Examples of the negative electrode current collector include Cu, Ni, and stainless steel, and Cu is preferable from the viewpoint of difficulty of making an alloy with sodium and easiness of processing into a thin film. The method for supporting a negative electrode mixture on the negative electrode current collector is the same as the method for producing an electrode described above. The negative electrode can be produced by a method of pressure molding, a method of obtaining a negative electrode mixture paste using a solvent, applying the paste on the negative electrode current collector, drying the paste, and pressing.

<Non-Aqueous Electrolyte Secondary Battery—Separator>

The separator includes members having a form of porous film, non-woven fabric, woven fabric or the like. Examples of the material of the separator include polyolefin resins such as polyethylene and polypropylene, fluorine resins, nitrogen-containing aromatic polymers, and the like. The separator may contain two or more materials. The separator may be a single layer separator or laminated separator. Examples of the separator include separators described in JP 2000-30686 A, JP 10-324758 A, or the like. The thickness of the separator is preferably thinner as long as mechanical strength is maintained, from the viewpoint of increasing the volumetric energy density of a battery and decreasing internal resistance.

The thickness of the separator is usually from about 5 to about 200 μm and preferably from about 5 to about 40 μm.

The separator preferably has a porous film containing a thermoplastic resin. In the secondary battery, it is preferred that, when an abnormal current flows in the battery due to short circuit between a positive electrode and a negative electrode or the like, to interrupt the current and to block (shutdown) the flow of excessive current. It is preferred that the separator shuts down at as low temperature as possible when exceeding usual use temperature (micropores of a porous film are obstructed when the separator has the porous film containing a thermoplastic resin), and even if the temperature in the battery increases to a certain high temperature after shutdown, the separator maintains shutdown state without being broken due to the increased temperature, in other words, have high heat resistance. A laminated film in which a heat resistant porous layer and a porous film containing a thermoplastic resin are stacked is used as the separator, whereby it is possible to further prevent thermal destruction of the secondary battery. Here, the heat resistant porous layer may be laminated on both surfaces of the porous film.

<Non-Aqueous Electrolyte Secondary Battery—Separator—Laminated Film>

Hereinbelow, the laminated film in which a heat resistant porous layer and a porous film containing a thermoplastic resin are stacked will be described. The thickness of this separator is usually 40 μm or less, and preferably 20 μm or less. It is preferred that the value of A/B be from 0.1 to 1 when the thickness of the heat resistant porous layer is denoted by A (μm) and the thickness of the porous film is denoted by B (μm). Furthermore, this separator has an air permeability according to the Gurley method of preferably from 50 to 300 sec/100 cc and further preferably from 50 to 200 sec/100 cc, from the viewpoint of ion permeability. This separator has a porosity of usually from 30 to 80% by volume and preferably from 40 to 70% by volume.

<Heat Resistant Porous Layer>

The heat resistant porous layer may contain a heat resistant resin. From the viewpoint of further enhancing ion permeability, the heat resistant porous layer is preferably thin, and the thickness of the heat resistant porous layer is preferably from 1 to 10 μm, further preferably front 1 to 5 μm, and particularly preferably from 1 to 4 μm. The heat resistant porous layer has micropores, and the pore size (diameter) is usually 3 μm or less and preferably 1 μm or less. The heat resistant porous layer can contain the filler described later.

Examples of the heat resistant resin include polyamide, polyimide, polyamideimide, polycarbonate, polyacetal, polysulfone, polyphenylene sulfide, polyether ether ketone, aromatic polyester, polyether sulfone, and polyether imide.

From the viewpoint of further enhancing heat resistance, the heat resistant resin is preferably polyamide, polyimide, polyamideimide, polyether sulfone or polyether imide, more preferably polyamide, polyimide or polyamideimide, further more preferably a nitrogen-containing aromatic polymer such as aromatic polyamide (para-oriented aromatic polyamide, meta-oriented aromatic polyamide), aromatic polyimide or aromatic polyamideimide, especially preferably an aromatic polyamide, and particularly preferably para-oriented aromatic polyamide (hereinafter, referred to as "para-aramid" in some cases). Examples of the heat resistant resin also include poly-4-methylpentene-1 and cyclic olefin-based polymers. By using these heat resistant resins, heat resistance can be enhanced, specifically, the thermal destruction temperature can be enhanced.

The thermal, destruction temperature depends on the type of the heat resistant resin, and the thermal destruction temperature is usually 160° C. or more. The above-described nitrogen-containing aromatic polymer is used as the heat resistant resin, whereby the thermal destruction temperature can be raised up to about 400° C. The thermal destruction temperature can be respectively raised up to about 250° C. when poly-4-methylpentene-1 is used, and up to about 300° C. when a cyclic olefin-based polymer is used.

The para-aramid is obtained by polycondensation of a para-oriented aromatic diamine and a para-oriented aromatic dicarboxylic halide, and consists substantially of a repeating unit in which an amide bond is linked at a para-position or according orientation position of an aromatic ring (for example, 4,4'-positions in biphenylene, 1,5-positions in naphthalene, and 2,6-positions in naphthalene). Specific examples of the para-aramids include para-aramids having a para-orientation type structure or a structure according to the para-orientation type, such as poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide), and para-phenyleneterephthalamide/2,6-dichloro para-phenyleneterephthalanamide copolymer.

The aromatic polyimide is preferably wholly aromatic polyimides produced by polycondensation of an aromatic diacid anhydride and a diamine. Specific examples of the diacid anhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Specific examples of the diamine include oxydianiline, para-phenylenediamine, benzophenonediamine, 3,3'-methylenedianiline, 3,3'-diaminobenzophenone, 3,3'-diaminodiphenylsulfone, and 1,5-naphthalenediamine. Solvent-soluble polyimides can be suitably used. Examples of such polyimide include a polyimide which is a polycondensate of 3,3',4,4'-diphenylsulfone tetracarboxylic dianhydride and art aromatic diamine.

The aromatic polyamideimide includes those obtained by polycondensation of an aromatic dicarboxylic acid and an aromatic diisocyanate and those obtained by polycondensation of an aromatic diacid anhydride and an aromatic diisocyanate. Specific examples of the aromatic dicarboxylic acid include isophthalic acid and terephthalic acid. Specific examples of the aromatic diacid anhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate, and m-xylene diisocyanate.

The filler that may be contained in the heat resistant porous layer may be selected from an organic powder, an inorganic powder and a mixture thereof. It is preferred that particles constituting the filler have an average particle size of from 0.0 to 1 µm. The shape of the filler includes an approximately spherical shape, a plate shape, a column shape, a needle shape, a whisker shape, and a fiber shape, and any shapes of the particles can be used, and approximately spherical particles are preferable since uniform pores are likely to be formed.

Examples of the organic powder as the filler include homopolymers or copolymers of two or more of styrene, vinyl ketone, acrylonitrile, methyl methacrylate, ethyl methacrylate, glycidyl methacrylate, glycidyl acrylate, methyl acrylate, and the like; fluorine resins such as polytetrafluoroethylene, ethylene tetra fluoride-propylene hexafluoride copolymer, ethylene tetrafluoride-ethylene copolymer, and polyvinylidene fluoride; melamine resins; urea resins; polyolefins; polymethacrylate; and the like. The organic powders may be used singly or can be used as a mixture of two or more thereof. Among these organic powders, a polytetrafluoroethylene powder is preferable from the viewpoint of chemical stability.

Examples of the inorganic powder as the filler include inorganic substances such as metal oxides, metal nitrides, metal carbides, metal hydroxides, carbonates and sulfates, and specifically, alumina, silica, titanium dioxide, calcium carbonate, and the like. The inorganic powders may be used singly or can be used as a mixture of two or more thereof. Among these inorganic powders, an alumina powder is preferable from the viewpoint of chemical stability. It is further more preferred that all particles constituting the filler be alumina particles and further preferred that all particles constituting the filler be alumina particles, and a part of or all of them be approximately spherical alumina particles.

The content of the filler in the heat resistant porous layer depends on the specific gravity of the material of the filler, and for example, when all particles constituting the filler are alumina particles, the weight of the filler is usually from 20 to 95 parts by weight, and preferably from 30 to 90 parts by weight, when the total weight of the heat resistant porous layer is defined as 100. These ranges can be appropriately set, depending on the specific gravity of the material of the filler.

<Porous Film>

In the laminated film, the porous film contains a thermoplastic resin. The thickness of this porous film is usually from 3 to 30 µm and further preferably from 3 to 20 µm. The porous film has micropores as the same as the heat resistant porous layer, and the pore size is usually 3 µm or less and preferably 1 µm or less. The porous film has a porosity of usually from 30 to 80% by volume and preferably from 40 to 70% by volume. In the non-aqueous electrolyte secondary battery, when exceeding the usual use temperature, the porous film plays a role in obstructing micropores by softening of the thermoplastic resin constituting the porous film.

The thermoplastic resin contained in the porous film includes those soften at 80 to 180° C., and those which are not dissolved in an electrolytic solution of a non-aqueous electrolyte secondary battery should be selected. Specifically, examples of the thermoplastic resin include polyolefin such as polyethylene and polypropylene and thermoplastic polyurethane, and a mixture of two or more of these substances may be used. From the viewpoint of softening at lower temperature to cause shutdown, polyethylene is preferable as the thermoplastic resin. Specific examples of the polyethylene include low density polyethylene, high density polyethylene, linear polyethylene, and the like, and also include ultrahigh molecular weight polyethylene. In order to enhance the puncture strength of the porous film, the thermoplastic resin preferably contains an ultrahigh molecular weight polyethylene. In the aspect of producing a porous film, the thermoplastic resin preferably contains a wax made of a polyolefin of low molecular weight (weight average molecular weight of 10000 or less) in some cases.

<Non-Aqueous Electrolyte Secondary Battery—Electrolytic Solution or Solid Electrolyte>

Examples of the electrolyte in the electrolytic solution include $NaClO_4$, $NaPF_6$, $NaAsF_6$, $NaSbF$, $NaBF_4$, $NaCF_3SO_3$, $NaN(SO_2CF_3)_2$, lower aliphatic carboxylic acid sodium salts, and $NaAlCl_4$, and a mixture of two or more of these substances may be used. Among them, at least one fluorine-containing sodium salts selected from the group consisting of $NaPF_6$, $NaAsF_6$, $NaSbF_6$, $NaBF_4$, $NaCF_3SO_3$ and $NaN(SO_2CF_3)_2$ are preferable.

Examples of the organic solvent in the electrolytic solution include carbonates such as propylene carbonate, ethylene carbonate, dimethyl carborlate, diethyl carbonate, ethyl methyl carbonate, isopropyl methyl carbonate, vinylene carbonate, 4-trifluoromethyl-1,3-dioxolan-2-one, and 1,2-di (methoxycarbonyloxy)ethane; ethers such as 1,2-dimethoxyethane, 1,3-dimethoxypropane, pentafluoropropy methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and compounds obtained by further introducing a fluorine substituent into the organic solvents. As the organic solvent, two or more of these solvents may be mixed and used.

A solid electrolyte may be used in place of the electrolytic solution. As examples of the solid electrolyte, organic solid electrolytes such as polyethylene oxide-based polymer and polymer containing at least one of polyorganosiloxane chain and polyoxyalkylene chain can be used. So-called gel type electrolytes in which an electrolyte solution is supported on a polymer can also be used. Sulfide electrolytes such as $Na_2S$—$SiS_2$, $Na_2S$—$GeS_2$, $Na_2S$—$P_2S_5$, and $Na_2S$—$B_2S_3$, or inorganic electrolytes containing sulfides such as $Na_2S$—$SiS_2$—$Na_3PO_4$ and $Na_2S$—$SiS_2$—$Na_2SO_4$, and inorganic solid electrolytes such as NASICON-type electrolytes such as $NaZr_2(PO_4)_3$ can also be used. By the use of these solid electrolytes, safety can be further enhanced in some cases. In the non-aqueous electrolyte secondary battery, when a solid electrolyte is used, the solid electrolyte sometimes plays a part as a separator, and in that case, the separator is not required in some cases.

EXAMPLES

The following description will further discuss the present invention in detail by means of examples. Various evaluations of the sodium-containing transition metal compound were performed as described below.

1. Powder X-Ray Diffractometry of Sodium-Containing Transition Metal Compound

Powder X-ray diffractometry of a sodium-containing transition metal compound was carried out using RINT 2500 TTR-type manufactured by Rigaku Corporation. A sodium-containing transition metal compound was filled on a dedicated holder, and the measurement was carried out in the range of diffraction angle 2θ=10 to 90° using a CuKα radiation source, to obtain a powder X-ray diffraction pattern.

2. Composition Analysis of Sodium-Containing Transition Metal Compound

A powder was dissolved in hydrochloric acid, then the composition analysis was performed using an inductively coupled plasma-atomic emission spectrometry (SPS 3000 manufactured by SII, hereinafter, referred to as ICP-AES in some cases).

Production Example 1

Production of Electrode Active Material $A^1$

In a polypropylene beaker, 44.388 g of potassium hydroxide was added to 300 ml of distilled water and dissolved by stirring, and potassium hydroxide was completely dissolved to prepare an aqueous potassium hydroxide solution (precipitant). In addition, in another polypropylene beaker, 21.21 g of iron (II) chloride tetrahydrate, 19.02 g of nickel. (IT) chloride hexahydrate, and 15.83 g of manganese (II) chloride tetrahydrate were added to 300 ml of distilled water and were dissolved by stirring to obtain an iron-nickel-manganese mixed aqueous solution. While stirring the precipitant, the iron-nickel-manganese mixed aqueous solution was added dropwise thereto, to obtain a slurry in which a precipitate was produced. Subsequently, the slurry was filtered and washed with distilled water, then dried at 100° C., to obtain the precipitate. The precipitate and sodium carbonate were weighed out so as to be at a molar ratio of Fe:Na=0.4:1, then dry-mixed using an agate mortar to obtain a mixture. Subsequently, the mixture was placed in an alumina calcination vessel and maintained at 900° C. for 6 hours in an air atmosphere using an electric furnace to be calcined, and the mixture was cooled to room temperature to obtain electrode active material $A^1$. Powder X-ray diffraction analysis revealed that the electrode active material $A^1$ was assigned to have a crystal structure of α-$NaFeO_2$ type. The analysis of the composition of the electrode active material $A^1$ by ICP-AES revealed that the molar ratio of Na:Fe:Ni:Mn was 1:0.4:0.3:0.3.

Example 1

Production of Electrode Mixture Paste $P^1$

For the production of electrode mixture paste $P^1$, $A^1$ in the production example as an electrode active material, acetylene black (HS100, manufactured by DENKI KAGAKU KOGYO KABUSHIKI KAISHA) as a conductive material, PVA (manufactured by Sigma-Aldrich Japan, PolyVinyl Alcohol, saponification degree=87 to 89%, Mw=146,000 to 186,000) as a binder, and NMP (lithium battery grade, manufactured by KISHIDA CHEMICAL Co., Ltd.) as an organic solvent were used. The PVA and NMP were weighed out so as to be PVA:NMP=5:95 (weight ratio), and these were mixed and stirred, whereby PVA was dissolved in NMP to obtain a binder solution. Using the binder solution, the materials were weighed out so as to have the composition of positive electrode active material $A^1$:conductive material:binder:NMP=90:7:3:80 (weight ratio), and stirred and mixed using T.K. FILMICS 30-25 type (manufactured by PRIMIX Corporation) to obtain electrode mixture paste $P^1$. The rotation conditions of the rotating wheel were set at 5,000 rpm and 3 minutes.

Example 2

Production of Electrode Mixture Paste $P^2$

For the production of electrode mixture paste $P^2$, $A^1$ in the production example as an electrode active material, acetylene black (HS100, manufactured by DENKI KAGAKU KOGYO KABUSHIKI KAISHA) as a conductive material, an ethylene-vinyl acetate copolymer (SUMIKAFLEX RP100S, manufactured by Sumika Chemtex Co., Ltd.), and NMP (lithium battery grade, manufactured by KISHIDA CHEMICAL Co., Ltd.) as an organic solvent were used. The ethylene-vinyl acetate copolymer and NMP were weighed out so as to be ethylene-vinyl acetate copolymer:NMP=5:95 (weight ratio), and these were mixed and stirred, whereby the ethylene-vinyl acetate copolymer was dissolved in NMP to obtain a binder solution. Using the binder solution, the materials were weighed out so as to have the composition of positive electrode active material $A^1$ conductive material:binder:NMP=90:6:4:100 (weight ratio), and stirred and mixed using T.K. FILMICS 30-25 type (manufactured by PRIMIX Corporation) to obtain electrode mixture paste $P^2$. The rotation conditions of the rotating wheel were set at 5,000 rpm and 3 minutes.

Example 3

Production of Electrode Mixture Paste $P^3$

Electrode mixture paste $P^3$ was obtained by the same procedures as in Example 2, except for using a mixture obtained by mixing an ethylene-vinyl acetate copolymer (SUMIKAFLEX RP100S, manufactured by Sumika Chemtex Co., Ltd.):polyacrylic acid-alkyl acrylate copolymers (AQUPEC 501EM, manufactured by Sumitomo Seika Chemicals Company Limited) at 4:1 (weight ratio) as a binder.

Example 4

Production of Electrode Mixture Paste $P^4$

Electrode mixture paste $P^4$ was obtained by the same procedures as in Example 2, except for using a mixture obtained by mixing PVA (manufactured by Sigma-Aldrich Japan, PolyVinyl. Alcohol, saponification degree=87 to 89%, Mw=146,000 to 186,000):polyacrylic acid-alkyl acrylate copolymers (AQUPEC 501EM, manufactured by Sumitomo Seika Chemicals Company Limited) at 4:1 (weight ratio) as a binder.

Comparative Example 1

Production of Electrode Mixture Paste $V^1$

Electrode mixture paste $V^1$ was obtained by the same procedures as in Example 2, except for using a PVdF#7305 solution (manufactured by KUREHA CORPORATION) as a binder solution.

Comparative Example 2

Production of Electrode Mixture Paste $V^2$

Electrode mixture paste $V^2$ was obtained by the same procedures as in Example 2, except for using a PVdF#1300 powder (manufactured by KUREHA CORPORATION) as a binder.

The water content of the electrode mixture paste was measured using a water-content measuring instrument (manufactured by Metrohm AG, 832 KF Thermoprep, 831 KF Coulometer) according to moisture vaporization-coulometric titration described in JIS-K0113. The heating temperature of the electrode mixture paste was set at 150° C.

In the viscosity measurement of the electrode mixture paste, using a stress rheometer (manufactured by TA Instruments Inc., AR-550), the equilibrium value when applying a constant shear rate under maintained at 23° C. was defined as the viscosity. For electrode mixture pastes $P^1$ to $P^4$ and $V^1$ to $V^2$, the viscosity measurement of the electrode mixture pastes was performed at 2 hours and 20 hours after preparing the electrode mixture pastes, and the flow stability of the electrode mixture pastes was evaluated from their viscosity change. The result obtained for the viscosity at 10 $sec^{-1}$ is shown in Table 1. "Unmeasurable" in Table 1 shows that the viscosity measurement could not be performed since the electrode mixture paste was gelated and hardened.

TABLE 1

| | Paste | Water (ppm) | Paste Viscosity (after 2 h) (mPa · s) | Paste Viscosity (after 24 h) (mPa · s) |
|---|---|---|---|---|
| Example 1 | $P^1$ | 24000 | 610 | 630 |
| Example 2 | $P^2$ | 13200 | 620 | 570 |
| Example 3 | $P^3$ | 26800 | 2100 | 1900 |
| Example 4 | $P^4$ | 20700 | 5400 | 7000 |
| Comparative Example 1 | $V^1$ | 10400 | 8500 | Unmeasurable |
| Comparative Example 2 | $V^2$ | 10000 | 4500 | Unmeasarable |

The electrode mixture pastes $P^1$ to $P^4$ and $V^1$ to $V^2$ were prepared, and after about 24 hours, these electrode mixture pastes were applied on an aluminum foil having a thickness of 20 μm using a doctor blade, and dried at 60° C. for 2 hours, then rolled at a pressure of 0.5 MPa using a roll press, to obtain electrodes $DP^1$ to $DP^4$ and $DV^1$ to $DV^2$. The electrode strength was evaluated by the presence or absence of exfoliation, shedding, and chip of the electrode mixture when the resulting electrodes were punched into a size of 14.5 mmφ by a punching machine. The evaluation result of the electrode strength is shown in Table 2. "Uncoatable" in Table 2 shows that the electrode mixture paste could not be applied since the electrode mixture paste was gelated and hardened.

TABLE 2

| | Electrode | Electrode Strength |
|---|---|---|
| Example 1 | $DP^1$ | No chip |
| Example 2 | $DP^2$ | No chip |
| Example 3 | $DP^3$ | No chip |
| Example 4 | $DP^4$ | No chip |
| Comparative Example 1 | $DV^1$ | Uncoatable |
| Comparative Example 2 | $DV^2$ | Uncoatable |

It was found from Table 1 and Table 2 that the electrode mixture paste of the present invention can avoid gelation and viscosity reduction and has stable flowability. The electrode obtained by using the electrode mixture paste also has good adhesive forces between the current collector and the electrode mixture and between constituent particles of the electrode mixture, and can suppress shedding of the electrode mixture.

Production Example 2

Production of Laminated Film (1) Production of Coating Slurry for Heat Resistant Porous Layer The amount 272.7 g of calcium chloride was dissolved in 4200 g of NMP, and then 132.9 g of para-phenylenediamine was added thereto and completely dissolved. To the resulting solution was slowly added 243.3 g of terephthalic dichloride, and the mixture was polymerized to obtain a para-aramid, and further, the para-aramid was diluted with NMP to obtain a para-aramid solution having a concentration of 2.0% by weight. To 100 g of the resulting para-aramid solution were added 2 g of a first alumina powder (manufactured by Nippon Aerosil Co., Ltd., Alumina C, average particle size 0.02 μm) and 2 g of a second alumina powder (Sumicorandom manufactured by Sumitomo Chemical Co., Ltd., AA03, average particle size 0.3 μm) as fillers in a total amount of 4 g, and they were mixed and treated three times by a nanomizer, and further, filtrated through a 1000 mesh wire netting and defoamed under a reduced pressure to produce a coating slurry for the heat resistant porous layer. The weight of the alumina powders (fillers) based on the total weight of the para-aramid and the alumina powders is 67% by weight.

(2) Production and Evaluation of Laminated Film

As the porous film, a polyethylene porous film (film thickness 12 μm, air permeability 140 sec/100 cc, average pore size 0.1 μm, porosity 50%) was used. On a PET film having a thickness of 100 μm, the polyethylene porous film was fixed, and the coating slurry for the heat resistant porous layer was applied on the porous membrane by a bar coater manufactured by Tester Sangyo Co., Ltd. The product was immersed in water, that was a poor solvent, while maintaining integration of the porous film applied on the PET film, to precipitate a para-aramid porous membrane (heat resistant porous layer). Thereafter, the solvent was dried, and the PET film was exfoliated to obtain a laminated film in which a heat resistant porous layer and a porous film were stacked. The laminated film had a thickness of 16 μm, and the para-aramid porous membrane (heat resistant porous layer) had a thickness of 4 μm. The laminated film had an air permeability of 180 sec/100 cc and a porosity of 50%. The cross section of the heat resistant porous layer in the laminated film was observed by a scanning electron microscope (SEM) to find that the heat resistant porous layer had relatively small micropores of about 0.03 to about 0.06 μm and relatively large micropores of about 0.1 to about 1 μm. Evaluations of the laminated film were carried out by the following (A) to (C).

(A) Measurement of Thickness

The thickness of the laminated film and the thickness of the porous film were measured according to JIS standard (K7130-1992). Also, as the thickness of the heat resistant porous layer, a value obtained by subtracting the thickness of the porous film from the thickness of the laminated film was used.

(B) Measurement of Air Permeability by Gurley Method

The air permeability of the laminated film was measured by digital timer mode Gurley type Densometer manufactured by Yasuda Seiki Seisakusho Ltd., according to JIS P8117.

(C) Porosity

A sample of the resulting laminated film was cut into a square with a side of 10 cm, and the weight W (g) and the thickness D (cm) thereof were measured. The weight ($W_i$; i is an integer from 1 to n) of each layer in the sample was obtained, and the volume of each layer was calculated from Wi and the true specific gravity (g/cm$^3$) of the material of each layer. The porosity (% by volume) was obtained according to the following formula.

Porosity (% by volume)=100×{1−(W1/true specific gravity 1+W2/true specific gravity 2+ . . . +Wn/true specific gravity n)/(10×10×D)}

When the laminated film similar to that obtained in Production Example is used as the separator, a sodium secondary battery which can further prevent thermal destruction of the film can be obtained.

INDUSTRIAL APPLICABILITY

The electrode mixture paste of the present invention is hard to gelate and can stably carry out coating, thus the coating yield is improved. The electrode obtained using the electrode mixture paste of the present invention has good adhesive force between the current collector and the electrode mixture and adhesive force between constituent particles of the electrode mixture, and can suppress shedding of the electrode mixture during coating. The present invention is industrially very useful.

The invention claimed is:

1. An electrode mixture paste comprising an electrode active material, a conductive material, a binder, and an organic solvent, wherein the electrode active material comprises a sodium-containing transition metal compound, the binder comprises a polymer soluble in the organic solvent, and the polymer has no structural unit derived from a vinylidene halide, wherein the polymer has the following structural unit (A) in the main chain and a glass transition temperature of −50° C. to 0° C., and includes an olefin polymer:

$$\text{--CHR}^1\text{--CR}^2\text{R}^3\text{--} \quad (A)$$

wherein $R^1$ and $R^2$ are each independently a hydrogen atom, a carboxyl group, or a divalent hydrocarbon group, $R^3$ is a hydrogen atom, a hydroxyl group, a thiol group, an ester group, an aryl group, a nitrile group, an amino group, an amide group, a cyclic amide group, a carboxyl group, an ether group, a phosphate group, a sulfonate group, a carboxylic acid ester group, or an inorganic acid ester group, and when the polymer has a plurality of structural units (A),
$R^1$ groups may be the same or different,
$R^2$ groups may be the same or different,
$R^3$ groups may be the same or different, and
$R^1$, $R^2$ and $R^3$ may be the same or different, excluding the case where all of $R^1$, $R^2$ and $R^3$ are hydrogen in structural unit (A), and the sodium-containing transition metal compound is represented by the following formula (B):

$$\text{Na}_x\text{MO}_2 \quad (B)$$

wherein M is one or more elements selected from the group consisting of Fe, Ni, Co, Mn, Cr, V, Ti, B, Al, Mg and Si, x is not less than 0.7 and not more than 1.2, and the sodium-containing transition metal compound has an $O_3$ type layered structure.

2. The electrode mixture paste according to claim 1, wherein the amount of water contained in the electrode mixture paste is 30000 ppm or less.

3. An electrode produced by applying an electrode mixture paste as defined in claim 1 on a current collector.

4. A non-aqueous electrolyte secondary battery having the electrode as defined in claim 3 as a positive electrode.

5. The non-aqueous electrolyte secondary battery according to claim 4 further having a separator.

* * * * *